(12) United States Patent
Jebramcik

(10) Patent No.: US 11,496,078 B2
(45) Date of Patent: Nov. 8, 2022

(54) METHOD FOR DETERMINING THE ROTOR POSITION OF A BLDC MOTOR

(71) Applicant: Beckhoff Automation GmbH, Verl (DE)

(72) Inventor: Patrick Jebramcik, Gütersloh (DE)

(73) Assignee: Beckhoff Automation GmbH, Verl (DE)

( * ) Notice: Subject to any disclaimer, the term of this patent is extended or adjusted under 35 U.S.C. 154(b) by 31 days.

(21) Appl. No.: 17/318,488

(22) Filed: May 12, 2021

(65) Prior Publication Data

US 2021/0265928 A1    Aug. 26, 2021

Related U.S. Application Data

(63) Continuation of application No. PCT/EP2019/080740, filed on Nov. 8, 2019.

(30) Foreign Application Priority Data

Nov. 13, 2018   (DE) .................... 10 2018 128 354.7

(51) Int. Cl.
*H02P 27/08* (2006.01)
*H02P 6/182* (2016.01)
*H02P 6/20* (2016.01)

(52) U.S. Cl.
CPC ............. *H02P 6/182* (2013.01); *H02P 6/20* (2013.01)

(58) Field of Classification Search
CPC ............. H02P 27/08; H02P 6/182; H02P 6/20
See application file for complete search history.

(56) References Cited

U.S. PATENT DOCUMENTS 8,093,847 B2   1/2012  Otaguro
8,159,162 B2   4/2012  Kanamori
(Continued)

FOREIGN PATENT DOCUMENTS

DE   102006026560 A1   12/2007
DE   102010029315 A1   12/2011
(Continued)

OTHER PUBLICATIONS

International Search Report and Written Opinion dated Jan. 24, 2020 in connection with International Patent Application No. PCT/EP2019/080740, 19 pages including English translation.
(Continued)

*Primary Examiner* — Cortez M Cook
(74) *Attorney, Agent, or Firm* — Dorsey & Whitney LLP

(57) ABSTRACT

A method for determining a rotor position of a BLDC motor with a magnetic rotor and stator having at least one exciter coil to which an exciter voltage is applied in accordance with a commutation process, comprises: interrupting the exciter voltage applied to the exciter coil, wherein the exciter voltage has a profile with at least one first section in which the profile of the exciter voltage has a non-vanishing finite gradient, wherein the exciter voltage in the first section is interrupted, and wherein at the time of interruption the exciter voltage has a value different from zero; capturing a voltage induced in the exciter coil by the magnetic rotor; restoring the exciter voltage to a value different from zero; and determining a rotor position of the rotor with respect to the exciter coil on the basis of the captured induced voltage.

14 Claims, 9 Drawing Sheets

(56) References Cited

U.S. PATENT DOCUMENTS

| | | |
|---|---|---|
| 9,190,940 B2 | 11/2015 | Markham |
| 2009/0167220 A1 | 7/2009 | Kanamori |
| 2010/0177626 A1 | 7/2010 | Otaguro |
| 2011/0260664 A1* | 10/2011 | Kim .................... H02P 27/08 318/400.14 |
| 2012/0049777 A1 | 3/2012 | Kern et al. |
| 2013/0169196 A1 | 7/2013 | Markham |

FOREIGN PATENT DOCUMENTS

| | | |
|---|---|---|
| DE | 102014001184 A1 | 7/2015 |
| EP | 2037567 A2 | 3/2009 |
| EP | 2596577 B1 | 1/2016 |
| WO | 2012010445 A2 | 1/2012 |
| WO | 2012025904 A2 | 3/2012 |

OTHER PUBLICATIONS

International Preliminary Report on Patentability dated Mar. 1, 2021 in connection with International Patent Application No. PCT/EP2019/080740, 142 pages including English translation.

Microchip AN1083 "Sensorless BLDC Control with BAck-EMF Filtering," Reston Condit Microchip Technology Inc. Jan. 1, 2007, 34 pages.

Li et al. "Self-Correction of Commutation Point for High-Speed Sensorless BLDC Motor with Low Inductance and Nonideal Back EMF," IEEE, vol. 32, No. 1, Jan. 2017, 10 pages.

\* cited by examiner

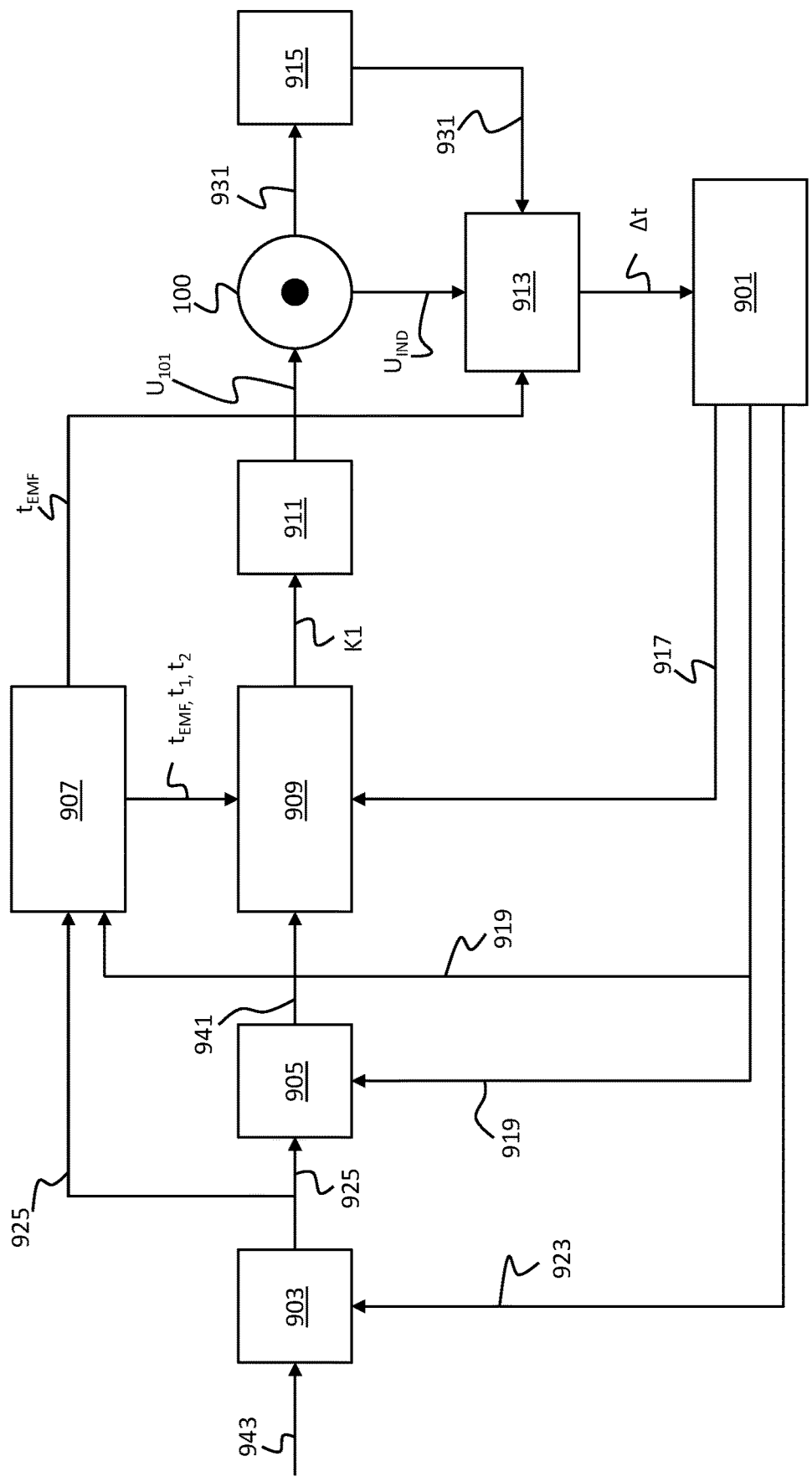

METHOD FOR DETERMINING THE ROTOR POSITION OF A BLDC MOTOR

CROSS-REFERENCE TO RELATED APPLICATIONS

This patent application is a continuation of International Patent Application PCT/EP2019/080740, METHOD FOR DETERMINING THE ROTOR POSITION OF A BLDC MOTOR, filed Nov. 8, 2019, which claims the priority of German patent application DE 10 2018 128 354.7, VERFAHREN ZUM BESTIMMEN EINER ROTORSTELLUNG EINES BLDC-MOTORS, filed Nov. 13, 2018, each of which is incorporated by reference herein, in the entirety and for all purposes.

FIELD

The invention relates to a method for determining a rotor position of a BLDC motor. The invention also relates to a method for starting a BLDC motor. The invention additionally relates to a motor with a device which is configured to execute the method for determining a rotor position of a BLDC motor.

BACKGROUND

BLDC (brushless direct current) motors have, in comparison with DC motors with a commutator, the advantages of a more compact design, a more continuous operation and a longer service life. Since a BLDC motor does not have a commutator, for the operation of a BLDC motor commutation has to be actively matched to a position of the rotor with respect to the stator of the BLDC motor. Various solutions are known for determining the rotor position in the prior art.

For example, U.S. Pat. No. 9,190,940 B2 describes a system for regulating the speed of a brushless motor, in which system a rotor position of the motor is determined by a Hall sensor.

In addition, methods for the sensor-free actuation of motors and for the sensor-free determination of rotor positions in motors are known, for example, from U.S. Pat. No. 8,159,162 B2. U.S. Pat. No. 8,159,162 B32 describes a method for starting a BLDC motor in which a phase in which the motor is accelerated with a forced commutation process is followed by a phase in which the coils are connected to a high impedance, which is in turn followed by a phase in which sensor-free control of the motor takes place.

EP 2 596 577 B1 and U.S. Pat. No. 8,093,847 B2 disclose methods for actuating multi-phase commutated electric machines in which a rotor position is determined by a zero crossover of the voltage which is induced in one of the coils of the commutated machine.

In the known prior art, in order to determine the rotor position it is necessary to operate at least one of the exciter coils without power for a substantial period of time. However, this results in adverse effects on the power in the motor mode. Moreover, in the prior art only a limited number of determinations of the rotor position can be carried out per rotation of the rotor. This can in turn lead to a situation in which the determination of the rotor position is not sufficiently accurate or takes a long time.

SUMMARY

An objective of the present invention is to provide a method for determining a rotor position of a BLDC motor. A further objective is to provide a method for starting a BLDC motor. A further objective is to provide a motor with a device which is configured to execute the method for determining a rotor position of a BLDC motor.

A method for determining a rotor position of a BLDC motor with a magnetic rotor and a stator with at least one exciter coil to which an exciter voltage is applied in accordance with a commutation process comprises the method steps: interrupting the exciter voltage which is applied to the at least one exciter coil, wherein the exciter voltage has a profile with at least one section in which the profile of the exciter voltage has a non-vanishing finite gradient, and wherein the exciter voltage in the section is interrupted, capturing a voltage which is induced in the at least one exciter coil, restoring the exciter voltage, and determining a rotor position of the rotor with respect to the at least one exciter coil on the basis of the captured induced voltage. Wherever an exciter coil is referred to below, this refers both to an individual exciter coil as well as to a multiplicity of exciter coils.

In this way, the rotor position can be determined with a measurement of the voltage induced in an exciter coil of the BLDC motor, specifically without in the process having to operate the BLDC motor without power for a relatively long time. Since the interruption in the exciter voltage of an exciter coil can be reduced to the period of time which is required at least for measuring the voltage which is induced in the respective exciter coil, the rotor position can be determined without the acceleration process of the BLDC motor being adversely affected by the method for determining a rotor position. The determination of the rotor position and the acceleration of the BLDC motor can therefore take place simultaneously. Consequently, a more gentle start phase of the BLDC motor is made possible and adverse effects on the power can be avoided.

The determination of a rotor position is not limited to the determination of a zero crossover of the induced voltage since the exciter voltage can be interrupted at any desired points in the voltage profile. The determination of the voltage which is induced in the respective exciter coil and a comparison of the measured induced voltage with a value which is to be expected for the induced voltage permits unambiguous determination of the rotor position on the basis of the captured voltage which is induced in the respective exciter coil.

It is therefore also possible to achieve a higher degree of flexibility in the capturing of measured values for the voltage induced in the exciter coil. As a result of the fact that the exciter voltage can be interrupted at any desired points in the voltage profile and measured values can be captured for the induced voltage, in principle any desired number of measured values for the induced voltage can be captured per rotation of the rotor. As a result, the precision of the determination of the rotor position can be increased and the duration of a determination of the rotor position can be shortened. In particular, it is therefore possible to shorten the interval between two determining processes of the rotor position, as a result of which it is possible in turn to achieve a higher bandwidth.

By interrupting the exciter voltage at a point in time at which the profile of the exciter voltage has a non-vanishing finite gradient, a measured voltage value of the induced voltage can be unambiguously assigned to a voltage value of the exciter voltage. This permits an unambiguous comparison of the voltage induced in the exciter coil and of the exciter voltage applied to the exciter coil. The comparison of the induced voltage with the voltage which is applied to the exciter coil makes it possible to determine the rotor position by virtue of the fact that a difference of the induced voltage from the applied exciter voltage represents a measure for the difference of an actual rotor position from a rotor position for which rotor position and commutation are matched to one another in an optimum way.

An exciter coil is understood in the text which follows to be a current-conducting winding which under electrical load is suitable for inducing a magnetic field by which the magnetic rotor can be accelerated. An exciter voltage is in this context a voltage which is applied to the exciter coil in order to generate the magnetic field.

An induced voltage is understood in the text which follows to be a voltage which is brought about in the exciter coil by a relative movement of the magnetic rotor with respect to the exciter coil and an associated change in the magnetic flux, passing through the exciter coil, of the magnetic rotor. The induced voltage is related to a back-electromotive force (BACK-EMF).

The interruption of the exciter voltage of the exciter coil is understood in the text which follows to mean the switching of the exciter coil from an active state into a high-impedance state. After the interruption of the exciter voltage, the current flow in the exciter coil is interrupted so that the exciter coil does not generate any magnetic field for the duration of the interruption of the exciter voltage. The interruption in the present sense occurs in the phases of the commutation in which the exciter voltage has a value which is different from zero. Phases in which the exciter coils have high impedance owing to the commutation do not correspond to interruption in the present sense.

A profile with a non-vanishing finite gradient is to be understood as being a voltage/time curve whose gradient does not assume the value 0 (zero) or the value co (infinite).

A rotor position is understood in the text which follows to be an orientation of the magnetic rotor relative to the exciter coil of the stator at a determined point in time. In a determined rotor position, the rotor has, at a point in time, a uniquely defined angle with respect to the exciter coil, for example with respect to the longitudinal axis of the exciter coil. A determined rotor position with respect to the exciter coil at a determined point in time does not exclude a movement of the rotor relative to the exciter coil at other times. Therefore, a uniformly rotating rotor also has a uniquely defined rotor position with respect to the exciter coil.

A method for the sensor-free starting of a BLDC motor comprises: a start phase, wherein in the start phase the BLDC motor is started with a predetermined forced commutation process, and the rotor is accelerated to a rotor speed which permits capturing of a voltage which is induced in the at least one exciter coil by the rotating rotor, a measuring phase, wherein when the rotor speed is reached the method steps of the method for determining a rotor position are executed in the measuring phase, and wherein after each determination of a rotor position according to the method for determining a rotor position adaptation of the commutation process to the determined rotor position is carried out, and an operating phase, wherein in the operating phase the commutation process is transformed into a block commutation process when a transformation time for further acceleration and for operation of the BLDC motor is reached.

As a result, an efficient method for the sensor-free starting of a BLDC motor is achieved. In particular, the technical advantage is achieved that despite lack of knowledge of the rotor position disruption-free starting of the BLDC motor is achieved by starting with a forced commutation process with a trapezoidal profile or sinusoidal profile, which has little disruption as a result of latching in of the rotor in comparison with starting with a forced block commutation process. In addition, the advantage is achieved that by virtue of the measuring phase it is possible to determine the rotor position and adapt the commutation process to the rotor position without the BLDC motor having to be switched to a de-energized state for this purpose. Instead, in the measuring phase it is possible to accelerate the BLDC motor further, so that adverse effects on the power of the BLDC motor within the measuring phase can be avoided.

Moreover, the commutation process can be adapted to a determined rotor position for a multiplicity of rotor positions determined at various points in time, within one rotation of the rotor. Therefore, the precision of the adaptation of the commutation process to the rotor position can be increased on the basis of the high number of adaptations of the commutation process to a multiplicity of rotor positions within one rotation of the rotor. In addition, adaptation can be achieved in a relatively low number of rotations of the rotor. Moreover, in the operating phase optimum operation can be ensured after the transformation of the commutation process into the block commutation process.

A BLDC motor is provided with a control device which is configured to execute a method for determining a rotor position and/or a method for starting a BLDC motor.

As a result, a BLDC motor is provided which can be operated with an efficient method for determining a rotor position and/or with an efficient method for starting.

EXAMPLES

In accordance with one embodiment, the exciter voltage is interrupted for a multiplicity of first points in time and is restored for a multiplicity of second points in time, wherein the induced voltage is captured for each interruption in the exciter voltage between the first points in time and the second points in time, and wherein a rotor position is determined for each captured induced voltage.

Per rotation of the rotor it is possible to capture a multiplicity of measured values for the induced voltage. The accuracy of the determination of the rotor position can be increased through the increased number of captured measured values. A determination of a rotor position can therefore be accelerated, so that only a small number of rotations of the rotor are required to determine the rotor position. In addition, incorrect measurements and incorrect determinations of the rotor position and associated incorrect adaptations of the commutation can be reduced.

The first point in time is to be understood here as being the point in time at which the interruption of the exciter voltage is initiated. The actual interruption of the exciter voltage which is characterized by the fact that the respective exciter coil has high impedance consequently occurs only at a later point in time than the first point in time. In contrast, at the first point in time the exciter voltage has a voltage potential according to the commutation process.

In contrast, the second point in time describes the point in time at which the exciter voltage again has a voltage value in accordance with the commutation process after the interruption has been concluded.

The first and second points in time therefore mark the time period of the interruption, but are not themselves arranged in the time period of the interruption. At the first and second points in time, the exciter voltage therefore has voltage values which it would have according to the commutation process even without an interruption.

In accordance with one embodiment, the stator of the BLDC motor has a multiplicity of exciter coils, to each of which an exciter voltage is applied, wherein the exciter voltage is interrupted in chronological succession for each of the exciter coils, and during the interruption a voltage which is induced in the respective exciter coil is captured, and wherein a rotor position is determined for each captured induced voltage.

By determining the rotor position for a multiplicity of exciter coils it is possible to increase further the number of determinations of the rotor positions per rotation of the rotor. It is therefore possible in turn to accelerate the determination of the rotor position and the associated adaptation of the commutation process. In addition, incorrect measurements and incorrect determinations of the rotor position can be reduced.

In accordance with one embodiment, the method step of determining a rotor position comprises the method steps: comparing the induced voltage which is captured at a measuring time with an induced voltage which is to be expected for the measuring time and for a rotor position to which the commutation process is matched to an optimum degree, forming a difference between the induced voltage and the induced voltage which is to be expected, and determining a commutation error, wherein the commutation error corresponds to a time difference between the measuring time and a third point in time, and wherein for the third point in time the induced voltage which is to be expected is equal to the induced voltage at the measuring time, and deriving the rotor position from the difference formed and the commutation error.

The rotor position can as a result be determined as a function of a virtual rotor position to which a given commutation process would be matched to an optimum degree. With the commutation error it is possible to determine a value for a chronological difference between the actual rotor position and the virtual rotor position to which the given commutation process would be matched to an optimum degree. The virtual rotor position serves here as a representative of the actual commutation process and constitutes for the given commutation process the desired rotor position for which commutation and rotor position are matched to one another to an optimum degree. In this way, the actual rotor position can be determined in relation to a desired rotor position. Since the virtual rotor position has a direct relationship with the actual commutation process, the actual rotor position can therefore be determined relative to the commutation process with the commutation error.

The induced voltage which is to be expected is to be understood in the text which follows as being the voltage which when there is a given commutation process induces the rotor position in an exciter coil to which the given commutation is adapted to an optimum degree. Optimum adaptation between the commutation and the rotor position is to be understood in the text which follows as meaning that when the commutation is adapted to an optimum degree the corresponding rotor position permits a maximum rotational speed for a given power of the BLDC motor.

In accordance with one embodiment, the induced voltage which is to be expected is determined from the exciter voltage.

A simple determination of the induced voltage which is to be expected can be implemented by measuring the exciter voltage.

In accordance with one embodiment, in order to determine the expected induced voltage at the measuring time the exciter voltage is determined at the first point in time and at the second point in time, wherein the expected induced voltage at the measuring time is equal to half the sum of the exciter voltage at the first point in time and the exciter voltage at the second point in time.

As a result, the simplest possible determination of the induced voltage which is to be expected is made possible.

In accordance with one embodiment, the voltage value which is to be expected is read out for the induced voltage from a database.

As a result, simple determination of a voltage value which is to be expected for the induced voltage is achieved.

In accordance with one embodiment, the voltage which is induced in the at least one exciter coil has a trapezoidal or sinusoidal profile.

The profile of the voltage which is induced in the exciter coil is matched with the profile of the exciter voltage. In this case, the determination of the rotor position can be simplified on the basis of the voltage which is induced in the exciter coil.

In accordance with one embodiment, the exciter voltage in accordance with the commutation process is a trapezoidal commutation process or a sinusoidal commutation process.

As a result, a start phase which is as uniform as possible for the BLDC motor is achieved, in which start phase the motor is operated with a forced commutation process and without knowledge of the rotor position.

In accordance with one embodiment, the operating phase comprises the method steps: capturing the voltage which is induced in the at least one exciter coil, determining a rotor position with respect to the at least one exciter coil on the basis of the captured induced voltage, and adapting the commutation process to the determined rotor position.

This ensures that even during full operation of the BLDC motor checking and adaptation of the commutation can be carried out.

In accordance with one embodiment of the method for starting a BLDC motor, the transformation time is determined by reaching a predetermined rotational speed of the BLDC motor and/or by reaching a predetermined limiting value of the commutation error.

Transformation of the BLDC motor from the commutation process into the block commutation process can be carried out for a point in time at which the commutation process of the BLDC motor is already adapted to the rotor position and therefore uniform operation of the BLDC motor in the block commutation mode can be ensured.

The transformation time can be coupled here to the point when a minimal commutation error is reached so that a limiting value for the quality of the commutation can be set with a predetermined minimum value for the commutation error, transformation not taking place before said error is reached.

Likewise, the transformation time can be tied to a minimum rotational speed, which can be advantageous owing to the ease of measurement of the rotational speed. A precondition here is that when a specific rotational speed is reached, the adaptation of the commutation has already progressed to such an extent that operation of the BLDC motor in the block commutation mode is possible without difficulty.

In accordance with one embodiment of the method for starting a BLDC motor, the adaptation of the commutation process comprises minimizing the commutation error.

This ensures that the adaptation of the commutation process is associated with a numerical value which is easy to determine. This contributes to the simplification of the method.

The commutation error corresponds to a chronological difference between the actual rotor position and a virtual rotor position for which the rotor position and commutation are matched to one another to an optimum degree. When the commutation process, which comprises minimizing the commutation error, is adapted, the commutation is therefore changed in such a way that the virtual rotor position of the changed commutation process corresponds to the actual rotor position.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 9 shows a schematic block circuit diagram of a control device of the BLDC motor in accordance with one embodiment.

DETAILED DESCRIPTION

Figure 1:
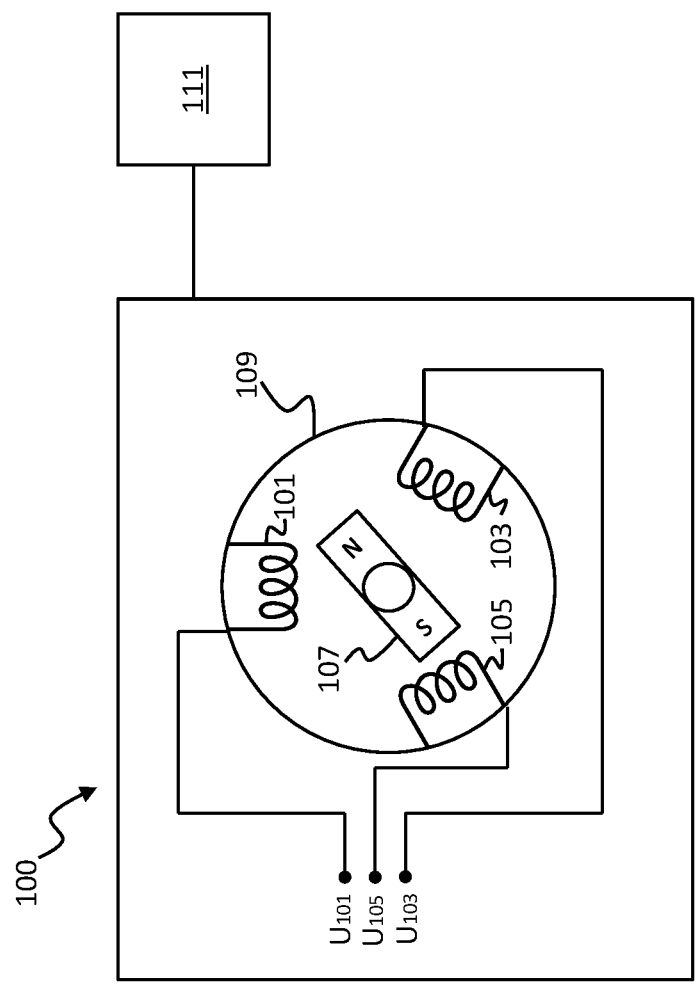
FIG. 1 shows a schematic view of a BLDC motor in accordance with one embodiment.

FIG. 1 shows a schematic view of a BLDC motor 100 with a stator 109, a rotor 107 which is designed to be rotatable with respect to the stator 109, and a control device 111 for controlling the motor 100.

The stator 109 here has three exciter coils 101, 103, 105, to each of which an exciter voltage $U_{101}$, $U_{103}$, $U_{105}$ is applied. The rotor 107 is embodied as a magnetic rotor and is fabricated, for example, from a permanent-magnetic material.

The rotor 107 is arranged within the stator 109 and is rotatable relative to the stator 109, about a rotational axis.

Three exciter coils 101, 103, 105 are arranged on the stator 109, in the radial direction about the rotational axis of the rotor 107. With the exciter voltage $U_{101}$, $U_{103}$, $U_{105}$ which is applied to the exciter coils 101, 103, 105, it is possible to bring about magnetic excitation in each exciter coil 101, 103, 105 and generate a magnetic field or a magnetic flux density.

With the magnetic fields of the exciter coils 101, 103, 105, the permanent-magnetic rotor 107 can be accelerated relative to the stator 109 and be excited to carry out a rotational movement. The rotational movement of the rotor 107 can be maintained by commutation of the exciter voltage $U_{101}$, $U_{103}$, $U_{105}$, of the individual exciter coils 101, 103, 105, at which the polarity of the exciter voltage $U_{101}$, $U_{103}$, $U_{105}$ changes alternately with a clock cycle which can be determined, and therefore the magnetic fields of the exciter coils 101, 103, 105 are provided with clocked alternating polarity.

The control device 111 is configured to control the BLDC motor 100. In particular, the control device 111 is configured to start the BLDC motor 100 with a method for starting the BLDC motor 100, and to operate it and to determine a rotor position of the rotor 107 with at least one exciter coil 101, 103, 105 with a method for determining a rotor position.

The control device is also designed to adapt a commutation process to the determined rotor position.

The control device 111 can be integrated into the BLDC motor 100 or embodied as an external control device 111.

In contrast to the embodiment illustrated in FIG. 1, other configurations of the BLDC motor 100 are also conceivable. For example, the number of exciter coils 101, 103, 105 can be increased or reduced. The exciter coils 101, 103, 105 can also be formed on the rotor 107, and the stator 109 can be embodied in a permanent-magnetic fashion. It is also possible for the stator 109 to be embodied within the rotor 107 and for the rotor 107 to rotate about the stator 109. Further variants are also conceivable. In particular, the BLDC motor can also be a linear motor.

Figure 2:
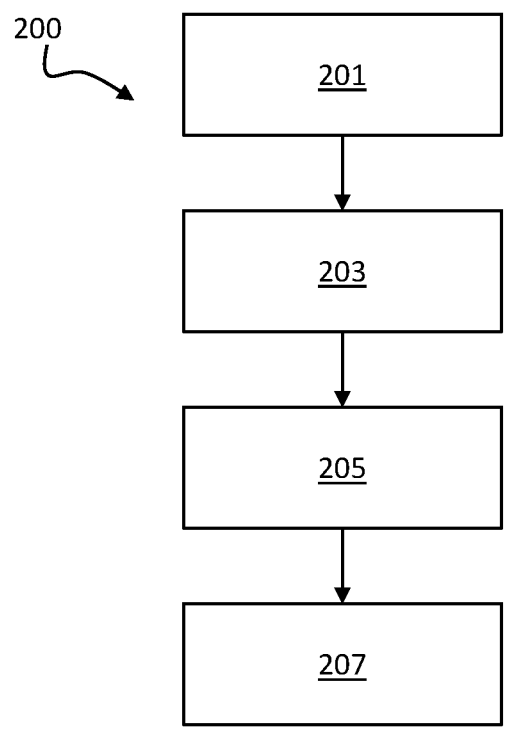
FIG. 2 shows a flow diagram of a method for determining a rotor position according to a first embodiment.

FIG. 2 shows a flow diagram of a method 200 for determining a rotor position of a BLDC motor according to a first embodiment, wherein the BLDC motor 100 preferably has a design according to the embodiment described with respect to FIG. 1. For example, the method is described on the basis of the first exciter coil 101, to which an associated first exciter voltage $U_{101}$ in accordance with a commutation process K1 is applied. The description can be transferred in an analogous fashion to the second exciter coil 103 and/or third exciter coil 105 in accordance with the embodiment according to FIG. 1 and/or, if appropriate, further exciter coils in accordance with embodiments of the BLDC motor 100 which are not illustrated. The method 200 for determining a rotor position can be carried out exclusively with the first exciter coil 101. Alternatively, it is conceivable that the method 200 for determining the rotor position is additionally also carried out with further exciter coils 103, 105, wherein the method steps start at different points in time with respect to the individual exciter coils 101, 103, 105, as will be explained in more detail in the text which follows.

According to FIG. 2, the method 200 for determining a rotor position of a BLDC motor 100 comprises the following method steps: interrupting 201 the first exciter voltage $U_{101}$ which is applied to the first exciter coil 101, capturing 203 a voltage $U_{IND}$ which is induced in the first exciter coil 101, restoring 205 the first exciter voltage $U_{101}$, and determining 207 a rotor position of the rotor 107 with respect to the first exciter coil 101 on the basis of the captured induced voltage $U_{IND}$.

According to the embodiment in FIG. 2, the method 200 for determining a rotor position of a BLDC motor 100 is applied after the BLDC motor 100 has already been accelerated in a preceding start phase. When the method 200 for determining a rotor position is applied, the rotor 107 of the BLDC motor 100 is therefore preferably already accelerated by the magnetic field of the exciter coils 101, 103, 105 and executes a relative movement with respect to the exciter coils 101, 103, 105. In addition, the rotor 107 can be accelerated to a speed which is sufficient to induce a measurable voltage $U_{IND}$ in the first exciter coil 101.

In order to accelerate the rotor 107 with respect to the exciter coils 101, 103, 105, the exciter voltage $U_{101}$, $U_{103}$, $U_{105}$ which is applied to the exciter coils 101, 103, 105 is subjected to a commutation process K1. The commutation process K1 can be configured here in such a way that the magnetic field of the exciter coils 101, 103, 105 alternates at least with respect to one field direction in such a way that the rotor 107 can be made to execute a rotational movement relative to the exciter coils 101, 103, 105 with the alternating magnetic field.

In a first method step 201, a first exciter voltage $U_{101}$ which is applied to the first exciter coil 101 of the BLDC motor 100 is interrupted. In this context, the first exciter coil 101 is placed in a high-impedance state so that an exciter current in the first exciter coil 101 stops.

When the first exciter voltage $U_{101}$ is interrupted, the first exciter coil 101 is changed into a high-impedance state in which there is no exciter voltage $U_{101}$ applied to the first exciter coil 101.

This changing of the first exciter coil 101 into a high-impedance state permits the measurement of the voltage $U_{IND}$ induced in the first exciter coil 101 by the relative movement of the magnetic rotor 107 with respect to the first exciter coil 101 and the associated changeover time in the magnetic flux through the first exciter coil 101 generated by the magnetic rotor 107.

A voltage $U_{IND}$ which is induced in the first exciter coil 101 by the movement of the rotor 107 with respect to the first exciter coil 101, the first exciter voltage $U_{101}$ of which coil has been interrupted in the first method step 201, is captured in a second method step 203. Per interruption of the first exciter voltage $U_{101}$, it is possible to capture a voltage value $U_{IND}(t_{EMF})$ of the induced voltage $U_{IND}$ for a measuring time $T_{EMF}$ during the interruption.

The interruption of the first exciter voltage $U_{101}$ can also be limited to the minimum period which is required to capture the voltage value $U_{IND}(t_{EMF})$, in order to keep an interruption time as short as possible and also to reduce to a minimum adverse effects on the power of the BLDC motor 100 owing to the interruption of the first exciter voltage $U_{101}$ and the associated reduction in the magnetic power of the first exciter coil 101.

However, it would also be conceivable to keep the duration of the interruption variable, in order to capture more than one voltage value of the induced voltage $U_{IND}$ per interruption of the first exciter voltage $U_{101}$, or in order to adapt the interruption better to the profile of the first exciter voltage $U_{101}$.

In a following third method step 205, the first exciter voltage $U_{101}$ is restored in such a way that the profile, predefined by the commutation process, of the first exciter voltage $U_{101}$ is continued. The voltage profile which is predetermined by the commutation process K1 remains unchanged together with the interruption.

In a subsequent fourth method step 207, a rotor position is determined on the basis of the induced voltage $U_{IND}$ determined at least at the measuring time $t_{EMF}$.

Figure 3:
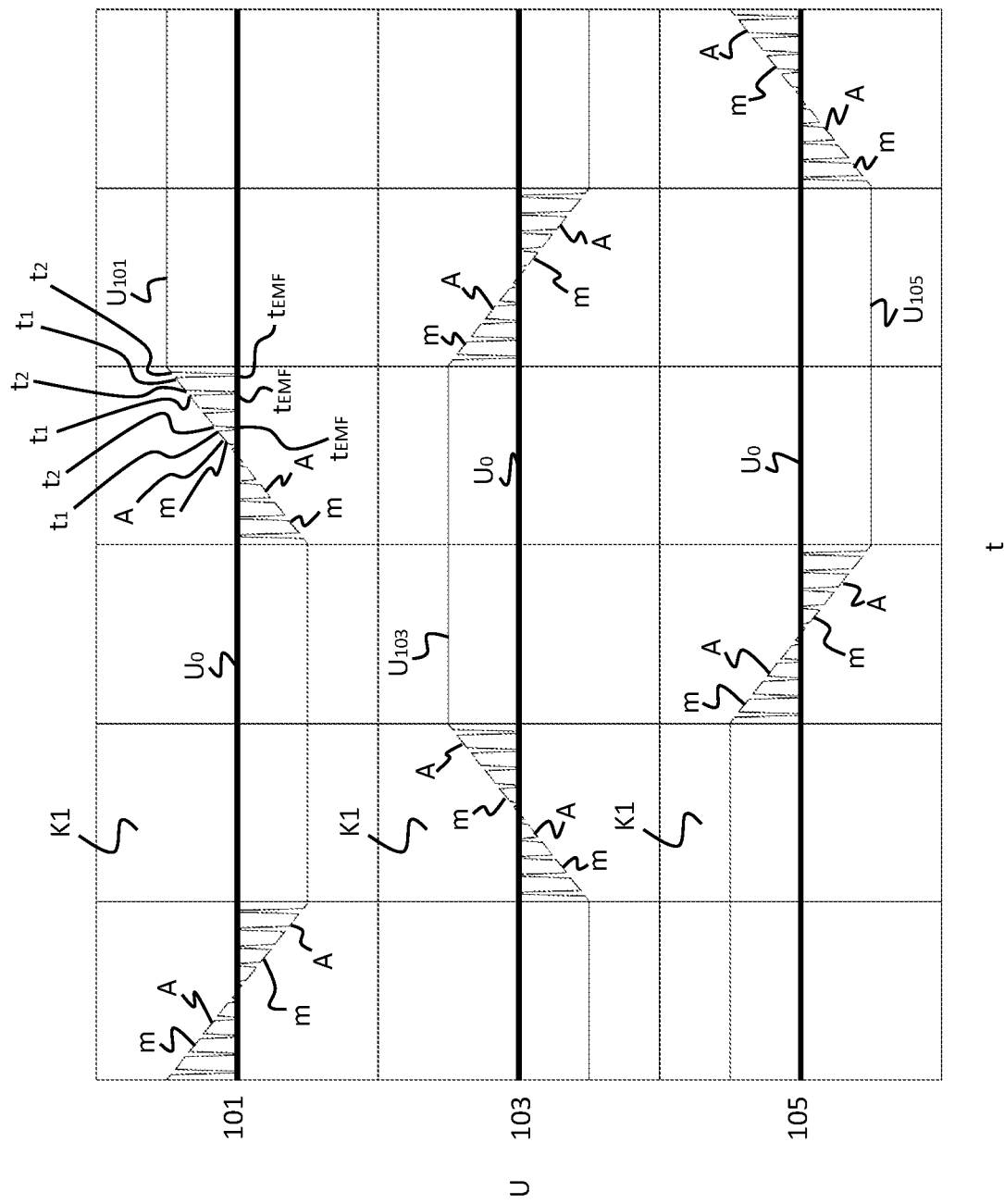
FIG. 3 shows a voltage/time diagram of a voltage profile of an exciter voltage according to the method for determining a rotor position in accordance with one embodiment.

FIG. 3 shows a voltage/time diagram of a voltage profile of an exciter voltage $U_{101}$, $U_{103}$, $U_{105}$ according to the method 200 for determining a rotor position in accordance with one embodiment, wherein the time t is plotted on the X axis and the voltage U on the Y axis. The method 200 described above for determining a rotor position is applied, according to FIG. 3, to all three exciter coils 101, 103 and 105.

FIG. 3 shows the profiles of the exciter voltages $U_{101}$, $U_{103}$, $U_{105}$ for the three exciter coils 101, 103 and 105 of the BLDC motor 100 described with respect to FIG. 1. The exciter voltages $U_{101}$, $U_{103}$, $U_{105}$ are each commutated according to the commutation process K1. In FIG. 3, the commutation process K1 is illustrated as a trapezoidal commutation process.

However, a sinusoidal commutation process or a comparable commutation process whose profile has a section A which has a non-vanishing finite gradient m is also conceivable.

The commutation process K1 can be generated, for example, by pulse width modulation PWM and can therefore continuously assume values between 0 volts and a positive intermediate circuit voltage of a circuit which is connected upstream of the exciter coils 101, 103, 105.

In FIG. 3, the respective exciter voltage $U_{101}$, $U_{103}$, $U_{105}$ is arranged symmetrically about the zero line $U_0$. The zero line $U_0$ characterizes the state in which the respective exciter coil 101, 103, 105 has high impedance and no exciter voltage $U_{101}$, $U_{103}$, $U_{105}$ is applied to said coil. The point in time $t_{EMF}$ at which the exciter coil 101, 103, 105 has high impedance is the point in time at which the respective exciter voltage $U_{101}$, $U_{103}$, $U_{105}$ of the interrupted exciter coil 101, 103, 105 assumes the value of the zero line $U_0$.

However, it would also be conceivable to shift the respective exciter voltage $U_{101}$, $U_{103}$, $U_{105}$ from the value in such a way that the lowest voltage corresponds to 0 volts. It would also be conceivable to shift the respective exciter voltage $U_{101}$, $U_{103}$, $U_{105}$ in such a way that the lowest value assumes any desired voltage value.

FIG. 3 illustrates a period of the respective exciter voltage $U_{101}$, $U_{103}$, $U_{105}$ with a trapezoidal commutation process K1 for the first exciter coil 101, the second exciter coil 103 and the third exciter coil 105, respectively. Each trapezoid has in each case two sections A in which the profile of the exciter voltage $U_{101}$, $U_{103}$, $U_{105}$ has a non-vanishing finite gradient m. In the present case, the section A describes the rising and falling edges of the trapezoids of the exciter voltages $U_{101}$, $U_{103}$, $U_{105}$ in a trapezoidal commutation process.

In the embodiment in FIG. 3, the respective exciter voltage $U_{101}$, $U_{103}$, $U_{105}$ is interrupted exclusively in the sections A which has the non-vanishing finite gradient m. Interruptions in the respective exciter voltage $U_{101}$, $U_{103}$, $U_{105}$ are illustrated for each of the three exciter coils 101, 103, 105 in each section A for a multiplicity of measuring times $t_{EMF}$.

In FIG. 3, each section A has in each case five interruptions, so that voltage values of the induced voltage $U_{IND}$ could be captured respectively for five different measuring times $t_{EMF}$ for each section A.

However, it would also be possible to provide a higher or lower number of interruptions and therefore of measuring times $t_{EMF}$ per section A.

However, it would also be conceivable to implement interruptions of the respective exciter voltages $U_{101}$, $U_{103}$, $U_{105}$ only for selected exciter coils 101, 103, 105 and/or only at selected sections A.

The intervals between successive interruptions may be made variable. Specifically these intervals can be adapted to the respective dimensions of the sections A. For example, the interruptions can be arranged chronologically closer to one another for sections A with a high gradient m, in order, for example, to be able to ensure that in each section A an identical number of interruptions is formed and consequently an identical number of voltage values of the induced voltage $U_{IND}$ are captured at the measuring times $t_{EMF}$.

However, different numbers of interruptions and measuring times $t_{EMF}$ per section A would likewise also be conceivable.

As illustrated in FIG. 3, each interruption starts with a first point in time $t_1$, which marks the point in time at which the interruption of the respective exciter voltage $U_{101}$, $U_{103}$, $U_{105}$ starts. The interruption ends, as illustrated, with a second point in time $t_2$ which marks the point in time at which the interruption ends, and the voltage potential is restored in accordance with the first commutation process K1 and the voltage profile, predetermined by the latter, of the respective exciter voltage $U_{101}$, $U_{103}$, $U_{105}$.

A measuring time $t_{EMF}$ is arranged precisely centrally between the first and second points in time $t_1$, $t_2$ and marks the point in time at which the respective exciter voltage $U_{101}$, $U_{103}$, $U_{105}$ assumes the value of the zero line $U_0$. The duration of the interruption is therefore given by the first and second points in time $t_1$, $t_2$ of the respective interruption and can be varied as desired.

In addition, the duration of the interruption can be adapted to the gradient m of the sections A, so that, for example, an increased gradient m for sections A is associated with a shorter duration of the interruption.

However, it is also conceivable that at least two of the three points in time $t_1$, $t_2$ and $t_{EMF}$ coincide chronologically.

In FIG. 3, only three of five of the first and second points in time $t_1$, $t_2$ and the measuring times $t_{EMF}$ are provided with corresponding reference symbols, also only for one section A of the first exciter voltage $U_{101}$ of the first exciter coil 101. This is only for the sake of clarity of the figure. Each of the notches formed in the rising and falling edges of the trapezoids or the sections A of the exciter voltages $U_{101}$, $U_{103}$, $U_{105}$ of the three exciter coils 101, 103, 105 corresponds to a triplet from the first point in time $t_1$, measuring time $t_{EMF}$ and second point in time $t_2$.

FIG. 3 does not illustrate the capturing of the induced voltage $U_{IND}$ at the measuring time $t_{EMF}$ in accordance with method step 203.

Figure 4:
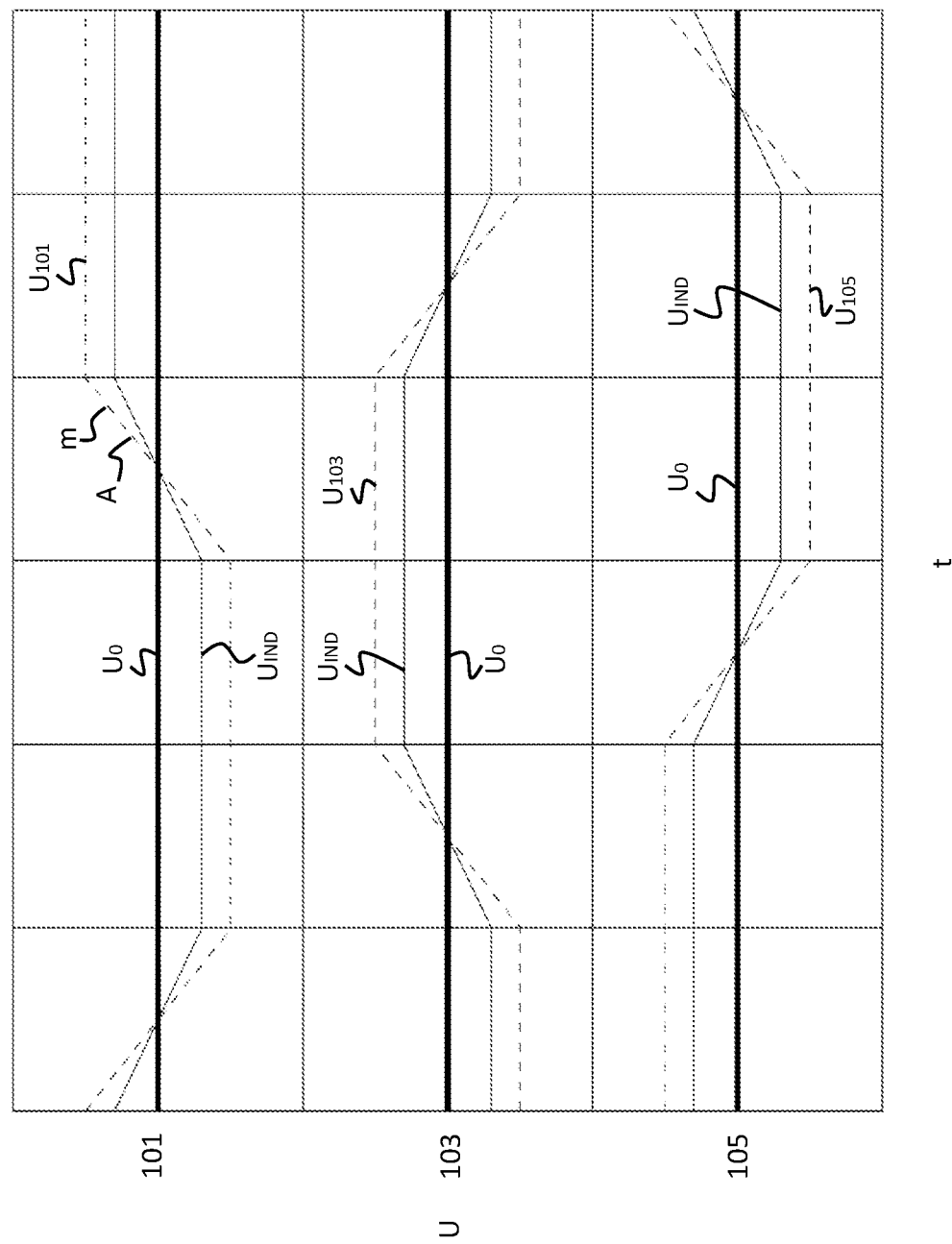
FIG. 4 shows a voltage/time diagram of the voltage profile of the exciter voltage and of a voltage profile of an induced voltage according to the method for determining a rotor position in accordance with one embodiment.

FIG. 4 shows a voltage/time diagram of the voltage profile of the exciter voltages $U_{101}$, $U_{103}$, $U_{105}$ and of a voltage profile of an induced voltage $U_{IND}$ according to the method 200 for determining a rotor position in accordance with the first embodiment, wherein the time t is plotted on the X axis and the voltage U on the Y axis.

FIG. 4 illustrates in turn voltage profiles of the exciter voltages $U_{101}$, $U_{103}$, $U_{105}$ for the three exciter coils 101, 103 and 105 of the BLDC motor 100 corresponding to FIG. 1. In addition, a profile of a voltage $U_{IND}$ which is induced in the respective exciter coil 101, 103, 105 by a relative movement of the magnetic rotor 107 with respect to the particular exciter coil 101, 103, 105 is illustrated for each exciter coil 101, 103, 105. The trapezoids of the respective induced voltage $U_{IND}$ and the trapezoids of the respective exciter voltages $U_{101}$, $U_{103}$, $U_{105}$ are arranged centered with respect to one another, and the zero crossovers of the exciter voltages $U_{101}$, $U_{103}$, $U_{105}$ and of the induced voltages $U_{IND}$ coincide.

Owing to loss effects, caused primarily by the resistance of the exciter coils 101, 103, 105, the respectively induced voltage $U_{IND}$ does not reach the voltage level of the exciter voltages $U_{101}$, $U_{103}$, $U_{105}$. The loss effects can be corrected or compensated by measuring the current and by knowledge of a resistance value of a respective exciter coil 101, 103, 105.

An induced voltage $U_{IND}$ whose profile corresponds to the profile of the exciter voltages $U_{101}$, $U_{103}$, $U_{105}$ of the respective exciter coil 101, 103, 105 would be to be expected for a rotor 107 which induces a voltage with a corresponding profile, given a commutation process K1 which is matched to an optimum degree to a rotor position of the rotor 107 and ignoring the specified loss effects. In the text which follows, such an induced voltage which is to be expected for an optimum rotor position is respectively designated by $U_{IND}^{EXP}$. In the present embodiment, such an induced voltage $U_{IND}^{EXP}$ which is to be expected can also assumed to be identical to the exciter voltages $U_{101}$, $U_{103}$, $U_{105}$.

In FIG. 4, the respective induced voltage $U_{IND}$ is also illustrated with a trapezoidal profile. The profile of the induced voltage $U_{IND}$ is primarily determined by the structural configuration of the magnetic rotor 107. Adaptation of the profile of the exciter voltages $U_{101}$, $U_{103}$, $U_{105}$ to the profile of the induced voltage $U_{IND}$ is advantageous here for the determination of the rotor position on the basis of the captured induced voltage $U_{IND}$, by virtue of the fact that in order to determine the rotor position in each case a comparison is made between the captured induced voltage $U_{IND}$ and an induced voltage $U_{IND}^{EXP}$ which is to be expected and which can be placed in a relationship with the respective exciter voltage $U_{101}$, $U_{103}$, $U_{105}$.

However, sinusoidal profiles are also conceivable both for the exciter voltages $U_{101}$, $U_{103}$, $U_{105}$ and for the induced voltages $U_{IND}$.

Figure 5:
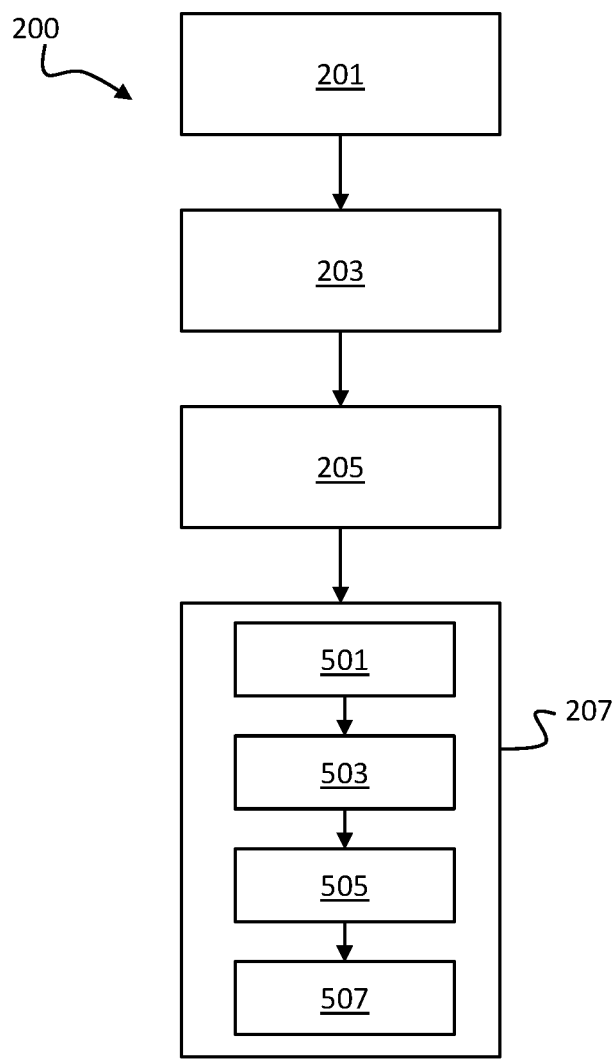
FIG. 5 shows a flow diagram of the method for determining a rotor position according to a further embodiment.

FIG. 5 shows a flow diagram of the method 200 for determining a rotor position in accordance with a further embodiment, wherein the first three method steps 201, 203 and 205 correspond to the first three method steps 201, 203 and 205 according to the description relating to FIG. 2. In accordance with the embodiment in FIG. 5, the fourth method step 207 comprises the method steps of comparing 501 the induced voltage $U_{IND}$ which is captured at a measuring time $t_{EMF}$ with an induced voltage $U_{IND}^{EXP}$ which is to be expected for the measuring time $t_{EMF}$ and for a rotor position which is matched to an optimum degree to the commutation process K1, forming 503 a difference $\Delta U$ between the induced voltage $U_{IND}$ and the induced voltage $U_{IND}^{EXP}$ which is to be expected, determining 505 a commutation error $\Delta t$, wherein the commutation error $\Delta t$ corresponds to a time difference $t_{EMF}$-$t_3$ between the measuring time $t_{EMF}$ and a third point in time $t_3$, wherein for the third point in time $t_3$ the induced voltage $U_{IND}^{EXP}(t_3)$ which is to be expected is equal to the induced voltage $U_{IND}(t_{EMF})$ at the measuring time $t_{EMF}$: $U_{IND}(t_{EMF})=U_{IND}^{EXP}(t_3)$, and deriving 507 the rotor position from the difference $\Delta U$ and the commutation error $\Delta t$.

As already explained above, the induced voltage $U_{IND}^{EXP}$ which is to be expected corresponds in the present case to a voltage which would be induced given optimum matching between the commutation process and rotor position in a respective exciter coil 101, 103, 105.

The difference $\Delta U$ constitutes here a numerical value which describes a difference of the measured induced voltage $U_{IND}$ from the induced voltage $U_{IND}^{EXP}$ which is to be expected.

Since the measured induced voltage $U_{IND}$ originates from the actual rotor position, while the induced voltage $U_{IND}^{EXP}$ which is to be expected describes an aimed-at rotor position for which the commutation process K1 would be adapted to an optimum degree and by which the maximum rotational speed could be reached for the commutation process K1 given a determined coil power, a difference of the actual rotor position from the desired rotor position can be determined by the difference $\Delta U$.

As already explained above, in the present embodiment the exciter voltages $U_{101}$, $U_{103}$, $U_{105}$ are used to determine the induced voltage $U_{IND}^{EXP}$ which is to be expected. For this purpose, the exciter voltages $U_{101}$, $U_{103}$, $U_{105}$ and the induced voltage $U_{IND}$ have a comparable profile.

A commutation error $\Delta t$ can also be determined with the induced voltage $U_{IND}^{EXP}$ which is to be expected and the previously determined difference $\Delta U$. The commutation error $\Delta t$ describes a chronological difference between the measuring time $t_{EMF}$ at which a specific voltage value $U_{IND}(t_{EMF})$ was measured for the induced voltage $U_{IND}$, and a third point in time $t_3$ which corresponds to the point in time at which the measured voltage value $U_{IND}(t_{EMF})=U_{IND}^{EXP}$ ($t_3$) should have been measured in accordance with the induced voltage $U_{IND}^{EXP}$ which is to be expected.

The induced voltage $U_{IND}$ corresponds to the actual rotor position. The induced voltage $U_{IND}^{EXP}$ which is to be expected corresponds to a rotor position which is matched to an optimum degree to the commutation process K1. The commutation error $\Delta t$ therefore describes the time value which the actual rotor position and the virtual rotor position which is matched to an optimum degree to the commutation process K1 differ from one another.

Since the virtual rotor position has a direct relationship with the commutation process K1, the commutation error $\Delta t$ therefore permits the determination of the actual rotor position relative to the commutation process K1.

Figure 6:
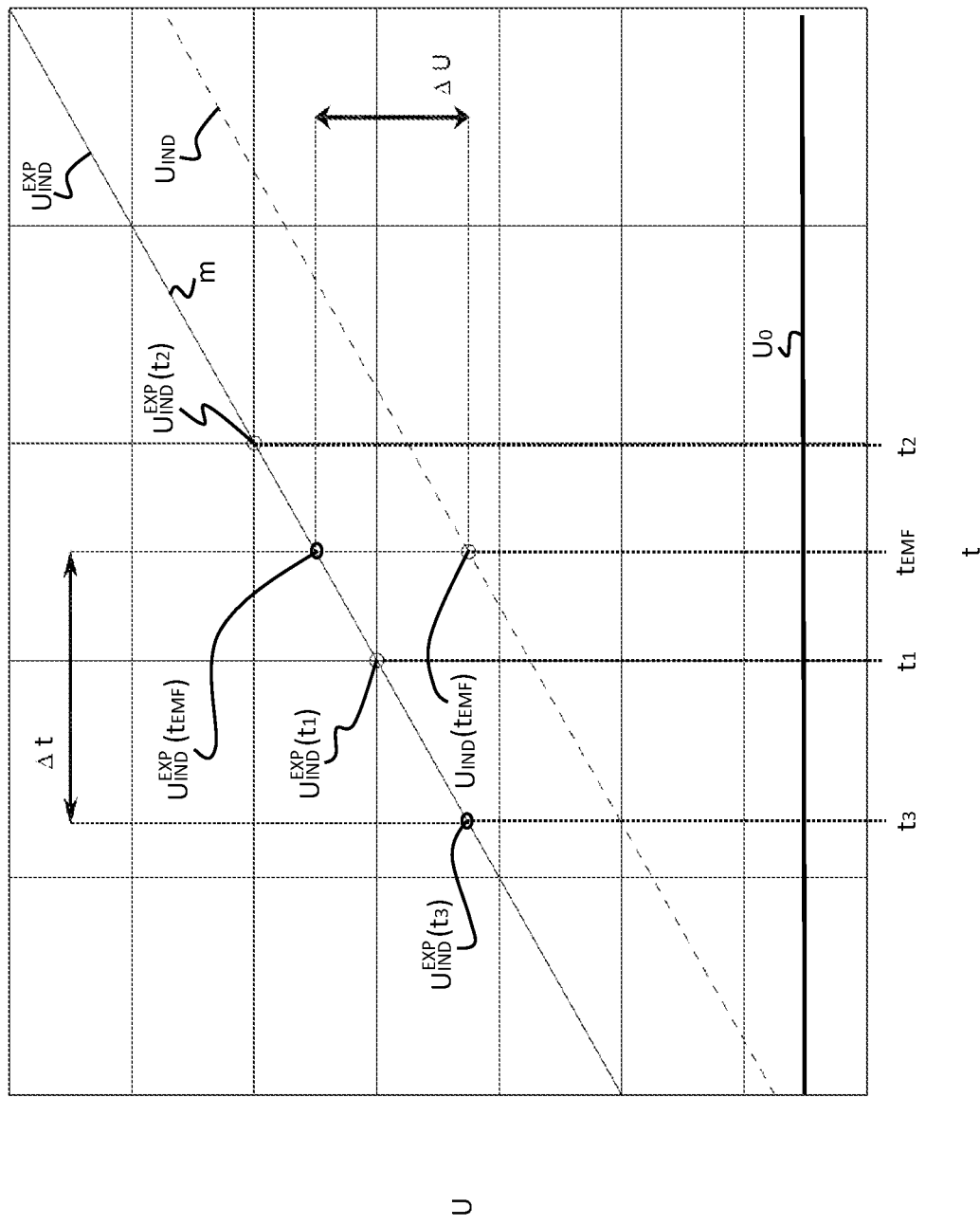
FIG. 6 shows a voltage/time diagram of the voltage profile of the induced voltage and of a voltage profile of an induced voltage which is to be expected according to the method for determining a rotor position in accordance with one embodiment.

FIG. 6 shows a voltage/time diagram of the voltage profile of the induced voltage $U_{IND}$ and a voltage profile of the induced voltage $U_{IND}^{EXP}$ which is to be expected, according to the method 200 for determining a rotor position in accordance with the first embodiment, wherein the time t is plotted on the X axis and the voltage U is plotted on the Y axis.

In FIG. 6, the time profiles are shown by way of example for the first exciter coil 101, both for a voltage $U_{IND}$ which is induced in the first exciter coil 101 and for an induced voltage $U_{IND}^{EXP}$ which is to be expected, in each case for a region within a section A of a trapezoid, comparable with a trapezoid with a section A in FIG. 4. In addition, a voltage value of the induced voltage $U_{IND}(t_{EMF})$ is shown at the measuring time $t_{EMF}$, and two voltage values of the induced voltages $U_{IND}^{EXP}$ ($t_1$) and $U_{IND}^{EXP}$ ($t_2$) which are to be expected, at the first point in time $t_1$ and at the second point in time $t_2$. The measuring time $t_{EMF}$ is arranged in the present case precisely centrally between the first point in time $t_1$ and the second point in time $t_2$, so that the following is true: $t_{EMF}=(t_1+t_2)/2$.

As already explained above, in the present example the first exciter voltage $U_{101}$ can be used to determine the induced voltage $U_{IND}^{EXP}$ which is to be expected. Supposing that the exciter voltage and induced voltage have an identical profile and ignoring loss effects, the first exciter voltage $U_{101}$ corresponds to the voltage profile which would be expected for the voltage which is induced in the first exciter coil 101 if the commutation process and rotor position were matched to one another to an optimum degree.

In order to determine the two voltage values $U_{IND}^{EXP}$ ($t_1$) and $U_{IND}^{EXP}$ ($t_2$), consequently according to one embodiment a measured value for the first exciter voltage $U_{101}$ can be respectively captured for the first and second points in time $t_1$ and $t_2$, where $U_{101}$ ($t_1$)=$U_{IND}^{EXP}$ ($t_1$) and $U_{101}$ ($t_2$)=$U_{IND}^{EXP}$ ($t_2$).

The first and second points in time $t_1$ and $t_2$ chronologically mark the interruption of the first exciter voltage $U_{101}$. The different values which the first exciter voltage $U_{101}$ or the induced voltage $U_{IND}^{EXP}$ which is to be expected assumes at the first and second points in time $t_1$ and $t_2$ are clearly apparent. The interruption of the first exciter voltage $U_{101}$ is not illustrated in FIG. 6.

In addition, FIG. 6 illustrates a voltage value $U_{IND}^{EXP}$ ($t_{EMF}$) of the induced voltage $U_{IND}^{EXP}$ which is to be expected at the measuring time $t_{EMF}$ which illustrates the expected value of the induced voltage $U_{IND}$ at the measuring time $t_{EMF}$. Since the first exciter voltage $U_{101}$ is interrupted at the measuring time $t_{EMF}$ in order to measure the induced voltage $U_{IND}$, the voltage value $U_{IND}^{EXP}$ ($t_{EMF}$) cannot be determined by a measurement. Instead, the voltage value $U_{IND}^{EXP}$ ($t_{EMF}$) is determined from the known values $U_{IND}^{EXP}$ ($t_1$) and $U_{IND}^{EXP}$ ($t_2$) in accordance with $U_{IND}^{EXP}$ ($t_{EMF}$)=($U_{IND}^{EXP}$ ($t_2$)+$U_{IND}^{EXP}$ ($t_1$))/2.

The difference $\Delta U$ between the induced voltage $U_{IND}^{EXP}$ ($t_{EMF}$) which is to be expected and the actually induced voltage $U_{IND}^{EXP}$ ($t_{EMF}$) where $\Delta U = U_{IND}^{EXP}$ ($t_{EMF}$)–$U_{IND}$ ($t_{EMF}$) can be determined with the voltage value for the expected induced voltage $U_{IND}^{EXP}$ ($t_{EMF}$) at the measuring time $t_{EMF}$.

In addition, the commutation error $\Delta t$ can be determined from the difference $\Delta U$ and the gradient $$m = \frac{\delta U_{IND}^{EXP}}{\delta t}$$

of the induced voltage $U_{IND}^{EXP}$ which is to be expected and which is determined with the captured voltage values $U_{IND}^{EXP}$ ($t_1$) and $U_{IND}^{EXP}$ ($t_2$) as follows:

$$m = \frac{\delta U_{IND}^{EXP}}{\delta t} = \left(U_{IND}^{EXP}(t_2) - U_{IND}^{EXP}(t_1)\right) / (t_2 - t_1),$$

in accordance with: $\Delta t = \Delta U/m$.

The commutation error $\Delta t$ is, as already explained above, a value for the chronological divergence between the actual rotor position and the commutation process K1. This is clarified in FIG. 6 by virtue of the fact that the commutation error $\Delta t = t_{EMF} - t_3$ is illustrated as a difference between the measuring time $t_{EMF}$ at which the induced voltage assumes the value $U_{IND}(t_{EMF})$ and the third point in time $t_3$, wherein the third point in time $t_3$ describes the point in time at which such a value would be expected in accordance with the induced voltage $U_{IND}^{EXP}$ which is to be expected, for a rotor position which is matched to an optimum degree to the commutation process K1, $U_{IND}^{EXP}$ ($t_3$)=$U_{IND}^{EXP}$ ($t_{EMF}$).

Figure 7:
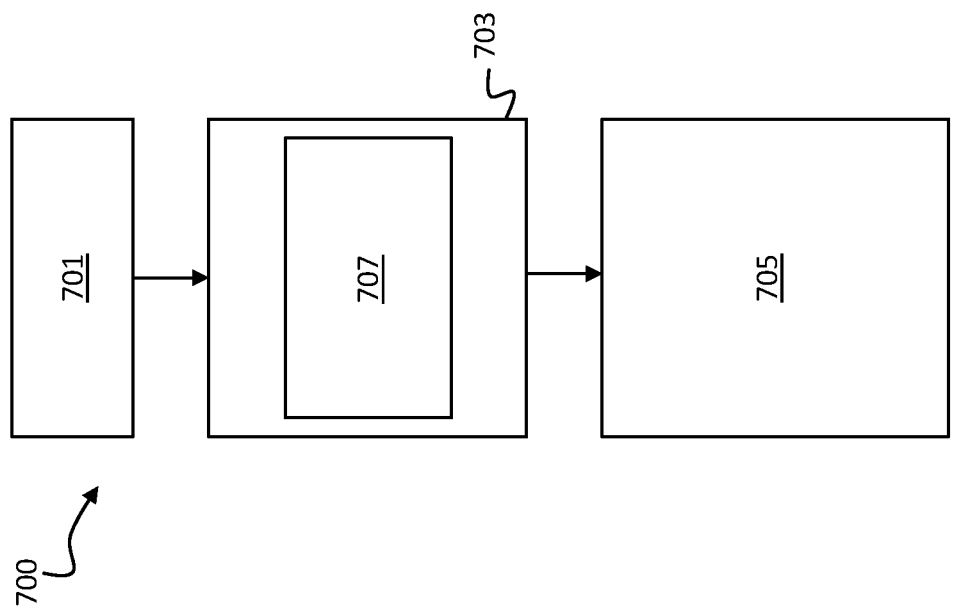
FIG. 7 shows a flow diagram of a method for starting a BLDC motor in accordance with one embodiment.

FIG. 7 shows a flow diagram of a method 700 for starting a BLDC motor 100 in accordance with one embodiment, wherein the BLDC motor 100 is embodied according to FIG. 1. In accordance with FIG. 7, the method 700 for starting a BLDC motor 100 comprises:

a start phase 701, wherein in the start phase 701 the BLDC motor 100 is started with a predetermined forced commutation process K1, and the rotor 107 is accelerated to a rotor speed which permits determination of a voltage $U_{IND}$ which is induced in the exciter coils 101, 103, 105 by the rotating rotor 107;

a measuring phase 703, wherein when the rotor speed is reached the method steps of the method 200 for determining the rotor position in accordance with the description relating to FIG. 2 to FIG. 6 are executed in the measuring phase 703, and wherein after each determination 207 of a rotor position according to the method 200 for determining a rotor position adaptation 707 of the commutation process is carried out in accordance with the determined rotor position; and an operating phase 705, wherein in the operating phase the commutation process K1 is transformed into a block commutation process BK when a transformation time $t_Ü$ for further acceleration and for operation of the BLDC motor 100 is reached.

In the start phase 701, the BLDC motor 100 can be started with a forced commutation process K1 and accelerated without knowledge of a rotor position of the BLDC motor 100. This forced commutation process K1 can preferably be a trapezoidal commutation process.

A sinusoidal commutation process or some other commutation process for which the exciter voltages of the exciter coils of the motor 100 has a profile with at least one section A in which the profile of the exciter voltages $U_{101}$, $U_{103}$, $U_{105}$ has a non-vanishing finite gradient m would optionally also be conceivable.

When a minimum speed of the rotor 107 which is required for a measurement of the induced voltage $U_{IND}$ is reached, the method 700 for starting a BLDC motor 100 goes into a measuring phase 703 in which the method 200 for determining a rotor position is carried out with the method steps described above.

In the measuring phase 703, after the determination of the rotor position in accordance with the method 200 for determining a rotor position, the commutation process K1 is also adapted to the determined rotor position in a further method step 707.

In the measuring phase 703 there can be provision that, at each determination of the rotor position according to method 200, an adaptation of the commutation process K1 is carried out according to the further method step 707. Therefore, for example for each measured voltage value $U_{IND}(t_{EMF})$ of the induced voltage $U_{IND}$, for which a rotor position is determined according to the fourth method step 207, the commutation process K1 can be subsequently adapted to the respective determined rotor position in accordance with the further method step 707, before a further voltage value $U_{IND}(t_{EMF})$ is measured.

By virtue of the fact that, as explained above, a multiplicity of measured values $U_{IND}(t_{EMF})$ for the induced voltage $U_{IND}$ can be captured in each section A of each trapezoid of each exciter coil 101, 103, 105, a multiplicity of adaptations of the commutation process K1 to the multiplicity of determined rotor positions can be carried out for each complete rotation of the rotor in the measuring phase 703.

When a transformation time $t_Ü$ is reached, the method 700 for starting a BLDC motor 100 goes into an operating phase 705 in which the commutation process K1 is transformed into a block commutation process BK.

In the operating phase, the starting of the BLDC motor 100 is concluded and normal operation of the BLDC motor 100 is made possible. Further acceleration of the BLDC motor 100 is, however, still possible.

Likewise, rotor positions can still be determined, and the block commutation process BK can be adapted to the determined rotor positions.

Figure 8:
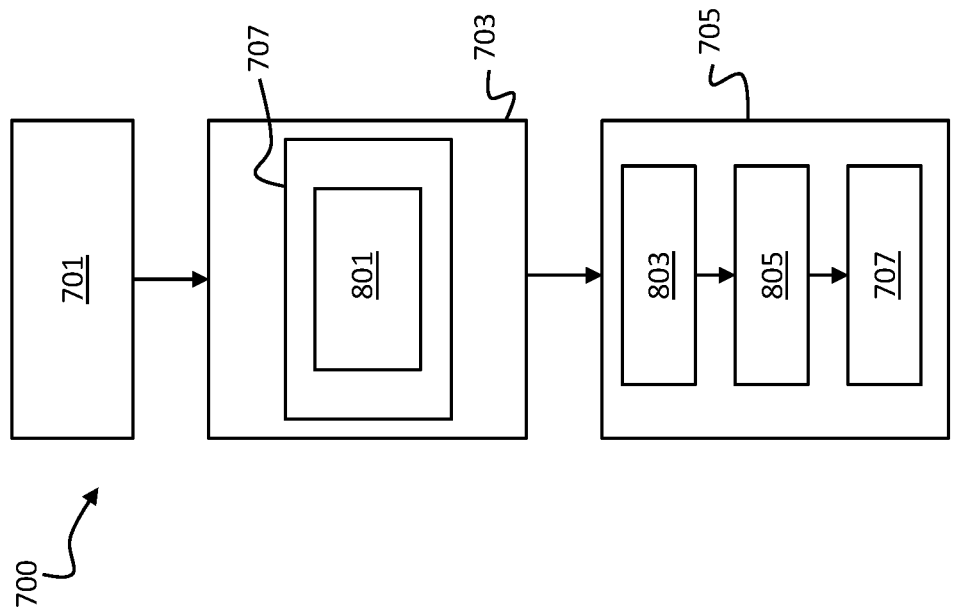
FIG. 8 shows a flow diagram of the method for starting a BLDC motor according to a further embodiment.

FIG. 8 shows a flow diagram of the method 700 for starting a BLDC motor 100 in accordance with a further embodiment, wherein the starting phase 701 corresponds to the starting phase 701 in accordance with the description relating to FIG. 7. According to the embodiment in FIG. 8, the further method step 707 of adapting the commutation process K1 to the determined rotor position comprises the additional method step 801 of minimizing the commutation error Δt.

As explained above, the commutation error Δt represents a measure for the difference between the commutation process K1 and the rotor position. In order to adapt the commutation, the exciter voltage $U_{101}$, $U_{103}$, $U_{105}$ which is respectively applied to the exciter coils 101, 13, 105 is changed in such a way that the commutation error Δt assumes a minimum value or adapts to a predetermined limiting value of the commutation error Δt.

The predetermined limiting value of the commutation error Δt can correspond here to matching between the commutation process K1 and rotor position, which is aimed at for efficient operation of the BLDC motor 100.

In addition, according to the embodiment in FIG. 8 the operating phase 705 comprises the first further method step 803 of determining an induced voltage $U_{IND}$ and second further method step 805 of determining a rotor position, as well as the further method step 707 of adapting the block commutation process BK to the determined rotor position.

As is customary for the operation of a BLDC motor 100 in a block commutation process, the induced voltage $U_{IND}$ is determined in the operating phase 705 at the points in time at which a respective exciter coil 101, 103, 105 is in a high-impedance state. In a way comparable to the first method step 201 in accordance with the description relating to FIG. 2, in the operating phase 705 it is consequently possible to dispense with an additional interruption of the respective exciter voltage $U_{101}$, $U_{103}$, $U_{105}$. The determination of a rotor position on the basis of the induced voltage $U_{IND}$ can occur in accordance with the customary procedure for BLDC motors 100 which are operated with block commutation.

FIG. 9 shows a block circuit diagram of a control device 111 of the BLDC motor 100 according to FIG. 1 in accordance with one embodiment.

In accordance with the embodiment in FIG. 9, the control device 111 comprises an observer 901, a position control module 903, a speed control module 905, a measuring time determining module 907, a commutation calculation module 909, a power control module 911, a difference determining module 913 and a current measuring module 915.

For example, the block circuit diagram is described on the basis of the first exciter coil 101 to which the associated first exciter voltage $U_{101}$ is applied in accordance with the commutation process K1. The description can be transferred in an analogous fashion to the second exciter coil 103 and/or third exciter coil 105 and/or, if appropriate, further exciter coils in accordance with embodiments of the BLDC motor 100 which are not illustrated.

In accordance with the embodiment in FIG. 9, the observer 901 is connected to the position control module 903, the speed control module 905, the measuring time determining module 907, the commutation calculation module 909, the difference determining module 911 and the current measuring module 915 and is designed to carry out an exchange of data with the specified modules.

The observer 901 is designed to determine, from a value for the commutation error Δt which the observer 901 receives from the difference determining module 913, an actual rotor position 917 of the rotor 107 in relation to the first exciter coil 101 of the BLDC motor 100, an actual rotor speed 919 of the rotor 107 and an actual rotor position 923 of the rotor 107.

The actual rotor position 923 describes here the position of the rotor 107 in relation to a rotor position reference value, for example an initial position of the rotor 107, and comprises all of the angle values which have been passed through by the rotor 107 since the start of the BLDC motor 100. The actual rotor position 923 is therefore a value of the number of rotor revolutions which have been carried out.

The position control module 903 is designed to determine, on the basis of an actual rotor position 923 which is transmitted by the observer 901 and a setpoint rotor position 945 which depends on a power specification, specific to each motor operation, of the BLDC motor 100, a setpoint rotor speed 925.

The speed control module 905 is designed to determine, on the basis of an actual rotor speed 919 which is transmitted by the observer 901 and the setpoint rotor speed 925 which is generated by the position control module 903, a voltage value 941, corresponding to the respective setpoint rotor speed 925, of the first exciter voltage $U_{101}$, which value corresponds to an amplitude value of the first exciter voltage $U_{101}$ in accordance with the commutation process K1.

The measuring time determining module 907 is designed to determine the first and second points in time $t_1$, $t_2$ of the interruptions and the measuring times $t_{EMF}$ on the basis of the actual rotor speed 919 transmitted by the observer 901 and/or on the basis of the setpoint rotor speed 925 which is transmitted by the position control module 903. Depending on the actual rotor speed 919 and depending on the steepness m of the sections A of the profile of the first exciter voltage $U_{101}$, the measuring time determining module 907 can make the interruptions shorter or longer and shift successive interruptions and successive measuring times $t_{EMF}$ such that they occur a shorter or longer time after one another, in order to ensure that each section A has an equal number of measuring times $t_{EMF}$.

The commutation calculation module 909 is designed to determine, on the basis of the voltage value 941 transmitted by the speed control module 905, on the basis of the measuring times $t_{EMF}$ transmitted by the measuring time determining module 907, and on the basis of the voltage profile in accordance with the commutation process K1, which profile can be stored in the commutation calculation module 909 or read out therefrom, the voltage profile of the first exciter voltage $U_{101}$ in accordance with a new, adapted commutation process K1 and in accordance with the determined setpoint rotor speed 925 including the determined interruptions with the measuring times $t_{EMF}$.

The power control module 911 is designed to apply a first exciter voltage $U_{101}$ in accordance with a commutation 939 which is determined by the commutation calculation module 909 to the first exciter coil 101 of the BLDC motor 100.

The current measuring module 915 is designed to determine a coil current 931 of the first exciter coil 101 of the BLDC motor 100.

The difference determining module 913 is designed to capture measured values for the induced voltage $U_{IND}$ at the measuring times $t_{EMF}$ and to determine the commutation error Δt in accordance with the method 200 for determining a rotor position from the induced voltage $U_{IND}$. In addition, the difference determining module 913 can take into account the coil current 913, determined by the current measuring module 915, in the correction of the measured expected induced voltage $U_{IND}^{EXP}$ with respect to the coil resistance.

According to the embodiment in FIG. 9, a determination of an actual rotor position 917 and an adaptation of the commutation process K1 to the determined rotor position in accordance with the method 200 for determining a rotor position and the method 700 for starting a BLDC motor 100 can take place as follows.

The determination of the rotor position and the adaptation of the commutation process K1, which takes place during the measuring phase 703 of the method 700 for starting a BLDC motor 100, are described. At the same time as the determination of the rotor position and as the adaptation of the commutation process K1 to the determined rotor position, an acceleration process of the motor 100 takes place.

In order to accelerate the motor 100, a setpoint rotor speed 925, which corresponds to a speed which is desired in accordance with the respective acceleration, is determined at an actual rotor speed 919 of the rotor 107 which corresponds to a speed at such a point in time, and the motor is operated with the newly determined setpoint speed.

The adaptation of the commutation process K1 to a determined rotor position also comprises transforming an actual rotor position 917 into a setpoint rotor position.

In this context, the position control module 903 and the commutation calculation module 909 perform different functions.

The position control module 903 captures a setpoint rotor position 945 and controls the movement of the motor in such a way that the actual rotor position 923 approximates to this setpoint rotor position 945, which brings about acceleration of the BLDC motor 100.

In contrast, the commutation calculation module 909 outputs the first exciter voltage $U_{101}$ in a way which matches the current actual rotor position 917, in order to adapt the commutation process K1 to the rotor position.

In the text which follows, these facts are not separated out from one another explicitly so that a setpoint rotor speed 925 is satisfactory both for the motor acceleration and for the adaptation of the commutation process K1 to the rotor position.

In order to adapt the commutation process K1 to a determined rotor position during an acceleration process of the motor 100, the observer 901 firstly determines an actual rotor position 917, an actual rotor speed 919 and an actual rotor position 923.

The determined actual rotor position 923 is subsequently transmitted from the observer 901 to the position control module 903. The actual rotor speed 919 is transmitted from the observer 901 to the speed control module 905 and to the measuring point determining module 907. The actual rotor position 917 is transmitted from the observer 901 to the commutation calculation module 909.

The position control module 903 determines a setpoint rotor speed 923 in accordance with the actual rotor position 923 and the setpoint rotor position 945, which the position control module 903 receives from an external individual acceleration specification, and said position control module 903 transmits said setpoint rotor speed 925 to the speed control module 905 and to the measuring time determining module 907.

The external individual acceleration specification comprises here a sequence of setpoint positions, wherein a new setpoint position is determined for each cycle. A setpoint speed or setpoint acceleration is obtained from the sequence of setpoint positions.

On the basis of the current actual rotor speed 919 and the new setpoint rotor speed 925, the measuring time determining module 907 determines the first and second points in time $t_1$, $t_2$ and the measuring times $t_{EMF}$ at which the first exciter voltage $U_{101}$ is to be interrupted for the coming measurements of the induced voltage $U_{IND}$ and at which the measured values of the induced voltage $U_{IND}$ are to be captured, and said measuring time determining module 907 transmits these first and second points in time $t_1$, $t_2$ and measuring times $t_{EMF}$ to the commutation calculation module 909.

The speed control module 905 transmits to the commutation calculation module 909 a voltage value 941 which corresponds to the setpoint speed. The corresponding voltage value 941 can depend here on a difference between an actual rotor speed 919 and a setpoint rotor speed 925 as well as the history of this difference.

The commutation calculation module 909 determines the commutation process K1, in particular the amplitude of the trapezoids and the gradient m of the edges in the case of a trapezoidal commutation process and the arrangement of the measuring times $t_{EMF}$ on the basis of the voltage value 941, the first and second points in time $t_1$, $t_2$ and measuring times $t_{EMF}$ and the profile of the first exciter voltage $U_{101}$ in accordance with the commutation process K1, which value is accessible to the commutation calculation module 909 as described above, and transmits the new commutation process K1 to a power stage 911.

The power stage 911 applies a first exciter voltage $U_{101}$ in accordance with the new commutation process K1 together with interruptions of the first exciter voltage $U_{101}$ at the determined measuring times $t_{EMF}$ to the first exciter coil 101 of the BLDC motor 100.

At the measuring times $t_{EMF}$, the difference determining module 913 respectively captures a value of the voltage $U_{IND}$ induced in the first exciter coil 101 of the BLDC motor 100. For this purpose, the difference determining module 913 receives, from the measuring time determining module 907, corresponding requests to capture measured values of the induced voltage $U_{IND}$ at the measuring times $t_{EMF}$.

A coil current 931 of the first exciter coil 101 of the BLDC motor 100 is determined by the current measuring module 915 and is transmitted to the difference determining module 913.

The difference determining module 913 uses the coil current 931 to correct the determined induced voltage $U_{IND}$ for a loss effect, caused primarily by the coil resistance. On the basis of the corrected induced voltage $U_{IND}$, the difference determining module 913 determines, as explained above, the commutation error $\Delta t$ and transmits it to the observer 901.

On the basis of the commutation error $\Delta t$, the observer 901 determines a new actual rotor position 917, a new actual rotor speed 919 and a new actual rotor position 923. For the determination of the new actual rotor position 923, the observer 901 also takes into account a time value which permits the observer 901 to determine a rotor rpm. The determined new actual rotor position 917 is subsequently transmitted by the observer 901 to the commutation calculation module 909 for further adaptation of the commutation process K1. The determined new actual rotor speed 919 is in turn transmitted by the observer 901 to the speed control module 905 and to the measuring time determining module 907. The new actual rotor position 923 is transmitted by the observer 901 to the position control module 903.

The procedure described above for adapting the commutation process K1 and for accelerating the BLDC motor 100 can also be carried out for points in time which do not correspond to the measuring times $t_{EMF}$ and at which consequently no measured values of the induced voltage $U_{IND}$ are captured and no commutation errors $\Delta t$ are determined. For such points in time, the observer 901 can use the previous commutation error $\Delta t$ for the determination of a new actual rotor position 923, a new actual rotor speed 919 and a new actual rotor position 917, until a new commutation error $\Delta t$ is determined by a new measurement at a later measuring time $t_{EMF}$.

As explained above, adaptation of the commutation process K1 to a determined rotor position takes place only in the measuring phase 703 and the operating phase 705. In the start phase 701, the motor 100 is operated with a forced commutation process K1 and accelerated therewith.

The acceleration process can be carried out in the start phase 701 in accordance with the procedure described above in such a way that a new actual rotor position 923, a new actual rotor speed 919 and a new actual rotor position 917 are determined by the observer 901 from the respective preceding setpoint rotor position 945, the setpoint rotor speed 925 and the setpoint rotor position in that the new actual value is equated to the preceding setpoint value. An actual adaptation of the values or a determination of the actual values which is actually carried out by measurement can be dispensed with.

If an application requires only speed control and no position control, the position control module 903 can be dispensed with. Instead of the setpoint rotor position 945, the setpoint rotor speed 925 is directly specified externally in this case.

Figure 10:
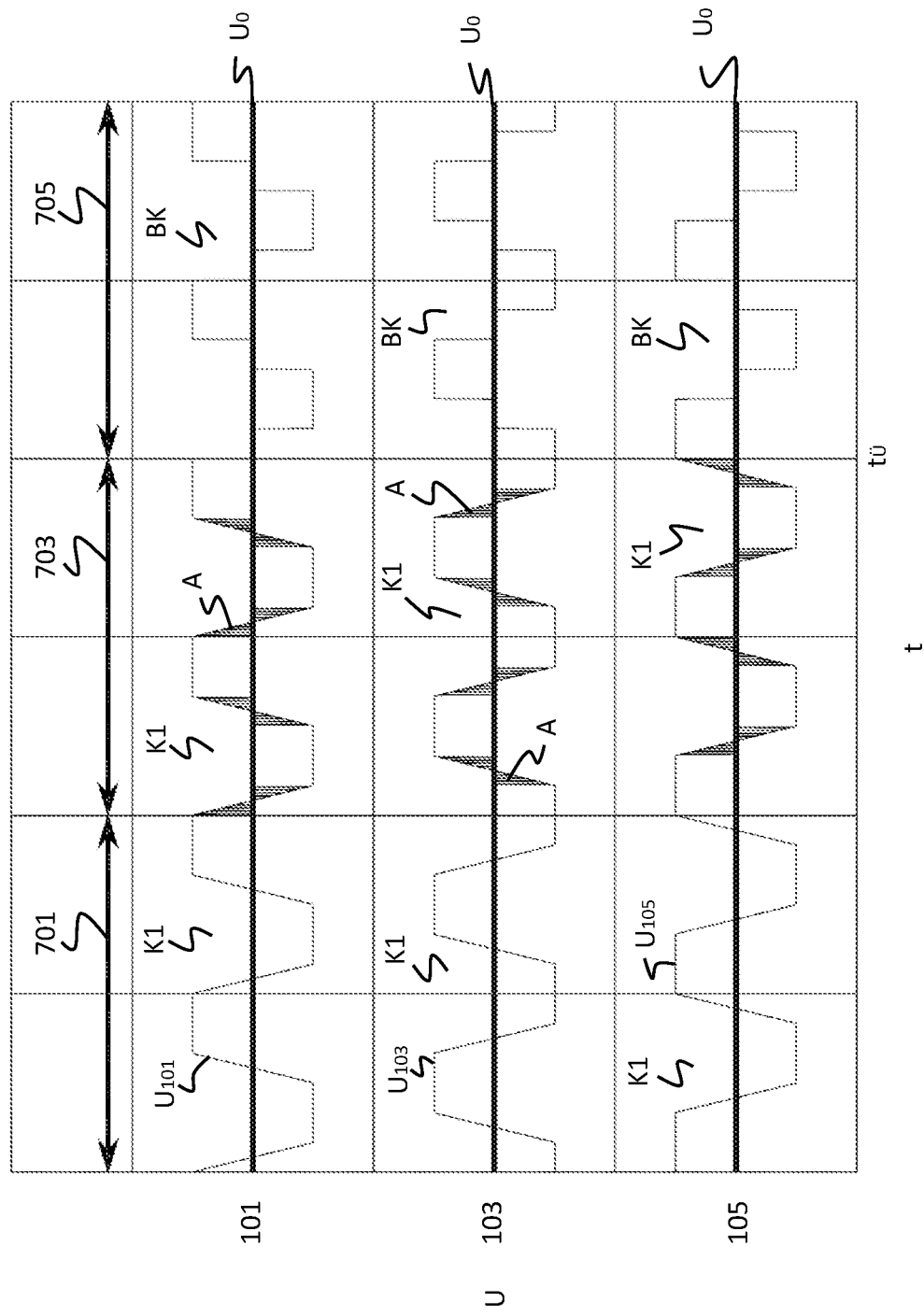
FIG. 10 shows a voltage/time diagram of the voltage profile of the exciter voltage according to a method for starting a BLDC motor in accordance with one embodiment.

FIG. 10 shows a voltage/time diagram of the voltage profile of the exciter voltage $U_{101}$, $U_{103}$, $U_{105}$ according to a method 700 as described above for starting a BLDC motor 100 in accordance with one embodiment, wherein the time t is plotted on the X axis and the voltage U is plotted on the Y axis.

FIG. 10 illustrates time profiles of the respective exciter voltage $U_{101}$, $U_{103}$, $U_{105}$ for three exciter coils 101, 103 and 105.

According to the embodiment illustrated in FIG. 10, in the start phase 701 the respective exciter voltage $U_{101}$, $U_{103}$, $U_{105}$ has the profile of the forced trapezoidal commutation process K1. In the start phase 701, the motor 100 is accelerated without determining the rotor position or carrying out adaptation of the commutation process K1.

In the adjoining measuring phase 703, the individual exciter voltage $U_{101}$, $U_{103}$, $U_{105}$ are interrupted in the respective sections A which are given in the trapezoidal commutation process by the edges of the respective trapezoids at a multiplicity of points in time $t_1$, $t_2$, $t_{EMF}$, a multiplicity of voltage values $U_{IND}(t_{EMF})$ are captured for the respectively induced voltage $U_{IND}$ at a multiplicity of measuring times $t_{EMF}$ and in accordance with the method 200 for determining a rotor position a rotor position is determined for each captured voltage value $U_{IND}(t_{EMF})$, and in accordance with the further method step 707 adaptation of the commutation process K1 to the determined rotor position is carried out.

Reference is made to FIG. 3 for a more detailed explanation and illustration of the interruptions of the individual exciter voltage $U_{101}$, $U_{103}$, $U_{105}$ and the recording of voltage values $U_{IND}(t_{EMF})$ for the respectively induced voltage $U_{IND}$ at a multiplicity of measuring times $t_{EMF}$ in the sections A.

When a transformation time $t_{Ü}$ is reached, the commutation process K1 is transformed into a block commutation process BK, and the BLDC motor 100 is operated in the operating phase 705.

At the transformation time $t_{Ü}$, the commutation process K1 is adapted to the rotor position in such a way that operation of the BLDC motor 100 is possible in the block commutation process BK without difficulty.

The transformation time $t_{Ü}$ can therefore be coupled to the reaching of a limiting value of the commutation error Δt so that transformation of the commutation process K1 into the block commutation process BK does not take place until the commutation error Δt is minimized to a value and the commutation process K1 is therefore adapted to the rotor position in such a way that operation of the BLDC motor 100 in the block commutation process BK is made possible.

Alternatively, the transformation time $t_{Ü}$ can be coupled to a predetermined rotational speed of the BLDC motor 100, for which the commutation error Δt is empirically sufficiently minimized and the commutation process K1 is sufficiently adapted for transformation into the block commutation process.

During the operating phase 705, the rotor position can continue to be determined and the block commutation process BK can be adapted to the determined rotor position. The measurement of the induced voltage $U_{IND}$ can take place, as is customary for the block commutation process BK, for points in time for which the respective exciter coil 101, 103, 105 has high impedance. The measurement of the induced voltage $U_{IND}$ and the determination of a rotor position and the adaptation of the block commutation process BK are not illustrated in FIG. 10.

This invention has been described with respect to exemplary embodiments. It is understood that changes can be made and equivalents can be substituted to adapt these disclosures to different materials and situations, while remaining with the scope of the invention. The invention is thus not limited to the particular examples that are disclosed, but encompasses all the embodiments that fall within the scope of the claims.

TABLE 1

| List of Reference Numerals | |
| --- | --- |
| 100 | BLDC motor |
| 103 | Second exciter coil |
| 105 | Third exciter coil |
| 107 | Rotor |
| 109 | Stator |
| 111 | Control device |
| 200 | Method for determining a rotor position of a BLDC motor |
| 201 | Interrupting an exciter voltage |
| 203 | Capturing an induced voltage |
| 205 | Restoring the exciter voltage |
| 207 | Determining a rotor position |
| 501 | Comparing the induced voltage with an induced voltage which is to be expected |
| 503 | Determining a difference between an induced voltage and an induced voltage which is to be expected |
| 505 | Determining a commutation error |
| 507 | Deriving the rotor position from the difference and the commutation error |
| 700 | Method for starting a BLDC motor |
| 701 | Start phase |
| 703 | Measuring phase |
| 705 | Operating phase |

TABLE 1-continued

| List of Reference Numerals | |
| --- | --- |
| 707 | Adapting the commutation process |
| 801 | Minimizing the commutation error |
| 803 | Capturing an induced voltage |
| 805 | Determining a rotor position |
| 901 | Position control module |
| 903 | Position control module |
| 905 | Speed control module |
| 907 | Measuring time determining module |
| 909 | Commutation calculation module |
| 911 | Power control module |
| 913 | Difference determining module |
| 915 | Current measuring module |
| 917 | Transmitting a first actual rotor position |
| 919 | Transmitting a first actual rotor speed |
| 921 | Transmitting a second actual rotor speed |
| 923 | Transmitting a second actual rotor position |
| 925 | Transmitting a setpoint rotor speed |
| 927 | Transmitting a first measuring time |
| 929 | Measuring an induced voltage and transmitting the measured values |
| 931 | Measuring a coil current |
| 933 | Transmitting a commutation error |
| 935 | Transmitting a current value |
| 937 | Transmitting a second measuring time |
| 939 | Outputting a commutation command |
| 941 | Transmitting a voltage value |
| 943 | Transmitting a setpoint rotor position |

TABLE 2

| List of Reference Symbols | |
| --- | --- |
| $U_{101}$ First exciter voltage | t1 First point in time |
| $U_{103}$ Second exciter voltage | t2 Second point in time |
| $U_{105}$ Third exciter voltage | t3 Third point in time |
| $U_0$ Zero line | $t_{EMF}$ Measuring time |
| $U_{IND}$ Induced voltage | Δt Commutation error |
| $U_{IND}^{EXP}$ Expected induced voltage | $t_{Ü}$ Transformation time |
| ΔU Voltage difference | K1 Commutation process |
| A Section | BK Block commutation process |
| m Gradient | |

What is claimed is:

1. A method for determining a rotor position of a BLDC motor with a magnetic rotor and a stator having at least one exciter coil to which an exciter voltage is applied in accordance with a commutation process, comprising the method steps:

interrupting the exciter voltage which is applied to the at least one exciter coil, wherein the exciter voltage has a profile with at least one first section in which the profile of the exciter voltage has a non-vanishing finite gradient, wherein the exciter voltage in the first section is interrupted, and wherein at the time of the interruption the exciter voltage has a value which is different from zero;

capturing a voltage which is induced in the at least one exciter coil by the magnetic rotor;

restoring the exciter voltage to a value which is different from zero; and determining a rotor position of the rotor with respect to the at least one exciter coil on the basis of the captured induced voltage.

2. The method as claimed in claim 1, wherein the exciter voltage is interrupted for a multiplicity of first points in time and is restored for a multiplicity of second points in time, wherein the induced voltage is captured for each interruption in the exciter voltage between the first points in time and the second points in time, and wherein a rotor position is determined for each captured induced voltage.

3. The method as claimed in claim 1, wherein the stator of the BLDC motor has a multiplicity of exciter coils, to each of which an exciter voltage is applied, wherein the exciter voltage is interrupted in chronological succession for each of the exciter coils, and during the interruption a voltage which is induced in the respective exciter coil is captured, and wherein a rotor position is determined for each captured induced voltage.

4. The method as claimed in claim 1, wherein the method step of determining a rotor position comprises the method steps:
    comparing the induced voltage which is captured at a measuring time with an induced voltage which is to be expected for the measuring time and for a rotor position to which the commutation process is matched to an optimum degree;
    forming a difference between the induced voltage and the induced voltage which is to be expected;
    determining a commutation error, wherein the commutation error corresponds to a time difference between the measuring time and a third point in time, and wherein for the third point in time the induced voltage which is to be expected is equal to the induced voltage at the measuring time; and
    deriving the rotor position from the difference formed and the commutation error.

5. The method as claimed in claim 4, wherein the induced voltage which is to be expected is determined from the exciter voltage.

6. The method as claimed in claim 4, wherein the induced voltage which is to be expected is read out from a database.

7. The method as claimed in claim 4, wherein the induced voltage which is to be expected is equal to the exciter voltage.

8. The method as claimed in claim 1, wherein the exciter voltage in accordance with the commutation process is a trapezoidal commutation process or a sinusoidal commutation process.

9. The method as claimed in claim 1, wherein the voltage which is induced in the at least one exciter coil has a trapezoidal or sinusoidal profile.

10. A method for starting a BLDC motor, comprising:
    a start phase, wherein in the start phase the BLDC motor is started with a predetermined forced commutation process, and the rotor is accelerated to a rotor speed which permits capturing of a voltage which is induced in the at least one exciter coil by the rotating rotor;
    a measuring phase, wherein when the rotor speed is reached the method steps of the method for determining a rotor position as claimed in claim 1 are executed in the measuring phase, and wherein after each determination of a rotor position according to the method for determining a rotor position as claimed in claim 1 adaptation of the commutation process to the determined rotor position is carried out; and
    an operating phase, wherein in the operating phase the commutation process is transformed into a block commutation process when a transformation time for further acceleration and for operation of the BLDC motor is reached.

11. The method for starting a BLDC motor as claimed in claim 10, wherein the operating phase comprises the method steps:
    capturing the voltage which is induced in the at least one exciter coil;
    determining a rotor position with respect to the at least one exciter coil on the basis of the captured induced voltage; and
    adapting the commutation process to the determined rotor position.

12. The method for starting a BLDC motor as claimed in claim 10, wherein the transformation time is determined by reaching a predetermined rotational speed of the BLDC motor and/or by reaching a predetermined limiting value of the commutation error.

13. The method for starting a BLDC motor as claimed in claim 10, wherein the adaptation of the commutation process comprises minimizing the commutation error.

14. A BLDC motor with a control device configured to execute a method for determining a rotor position as claimed in claim 1 and/or a method for starting a BLDC motor as claimed in claim 10.

\* \* \* \* \*